(12) United States Patent
Baltus et al.

(10) Patent No.: US 8,326,827 B2
(45) Date of Patent: Dec. 4, 2012

(54) NETWORK PEER-TO-PEER GOODS AND SERVICES DELIVERY SYSTEM AND METHOD FOR RANKING PEERS BY DEGREES OF ASSOCIATION

(75) Inventors: Michael M. L. Baltus, Brussels (BE); Jean-Marc Naef, Anieres (CH); Francisco Jose Mingorance Garcia, Brussels (BE)

(73) Assignee: Magic Network SARL, Geneva (CH)

( * ) Notice: Subject to any disclaimer, the term of this patent is extended or adjusted under 35 U.S.C. 154(b) by 372 days.

(21) Appl. No.: 12/423,742

(22) Filed: Apr. 14, 2009

(65) Prior Publication Data

US 2009/0259657 A1    Oct. 15, 2009

Related U.S. Application Data

(60) Provisional application No. 61/071,133, filed on Apr. 14, 2008, provisional application No. 61/129,836, filed on Jul. 23, 2008.

(51) Int. Cl.
G06F 17/30    (2006.01)

(52) U.S. Cl. .................................................. 707/723

(58) Field of Classification Search ................ 707/609, 707/723, 622, 737, 748, 758, 5; 709/240; 737/114

See application file for complete search history.

(56) References Cited

U.S. PATENT DOCUMENTS

| | | | | |
|---|---|---|---|---|
| 7,092,936 | B1* | 8/2006 | Alonso et al. ................ | 707/737 |
| 7,716,179 | B1* | 5/2010 | Agapiev et al. .............. | 707/622 |
| 7,725,472 | B2* | 5/2010 | Uchiyama ..................... | 707/758 |
| 7,783,600 | B1* | 8/2010 | Spertus et al. ................ | 707/622 |
| 7,849,079 | B2* | 12/2010 | Chandrasekar et al. ...... | 707/723 |
| 7,856,441 | B1* | 12/2010 | Kraft et al. ................... | 707/758 |
| 7,921,107 | B2* | 4/2011 | Chang et al. .................. | 707/723 |
| 7,930,302 | B2* | 4/2011 | Bandaru et al. .............. | 707/737 |
| 8,161,052 | B2* | 4/2012 | Reddy et al. .................. | 707/748 |
| 8,200,663 | B2* | 6/2012 | Jones et al. .................... | 707/723 |
| 2008/0172374 | A1* | 7/2008 | Wolosin et al. ................ | 707/5 |
| 2009/0177624 | A1* | 7/2009 | Ahlin ............................. | 707/3 |

OTHER PUBLICATIONS

Gerhard Weikum, A Result Mergin in a Peer-to-Peer Web Search Engine, Saarland University, Germany, 2005, pp. 6-14 and 31-39.*

Christian Zimmer, Efficient Search and Approximate Information Filtering in a Distributed Peer-to-Peer Environment of Digital Libraries, Tirrenia, Pisa (Italy), 2007, pp. 2-14.*

Filippo Menczer, A Collaborative Web Search Network, Indiana University School fo Informatics Bloomington, 2007, pp. 3-8.*

* cited by examiner

*Primary Examiner* — Hung T Vy
*Assistant Examiner* — Mongbao Nguyen
(74) *Attorney, Agent, or Firm* — Arent Fox LLP

(57) ABSTRACT

Methods and systems for providing a list of peers that satisfy a query are disclosed. A plurality of peer profiles are obtained from a data repository, each having a degree of association with the query originating peer. A first and second group of peers, respectively having a first and second degree of association with the query originating peer are determined. A third group of peers that satisfy the query are determined. A fourth group of peers is determined from the third group based on an assigned score to each of the peers in the first and second group, the assigned score reflecting a degree of association between the query originating peer and each of the peers in the first and second group. Results are ranked based on the assigned score.

20 Claims, 13 Drawing Sheets

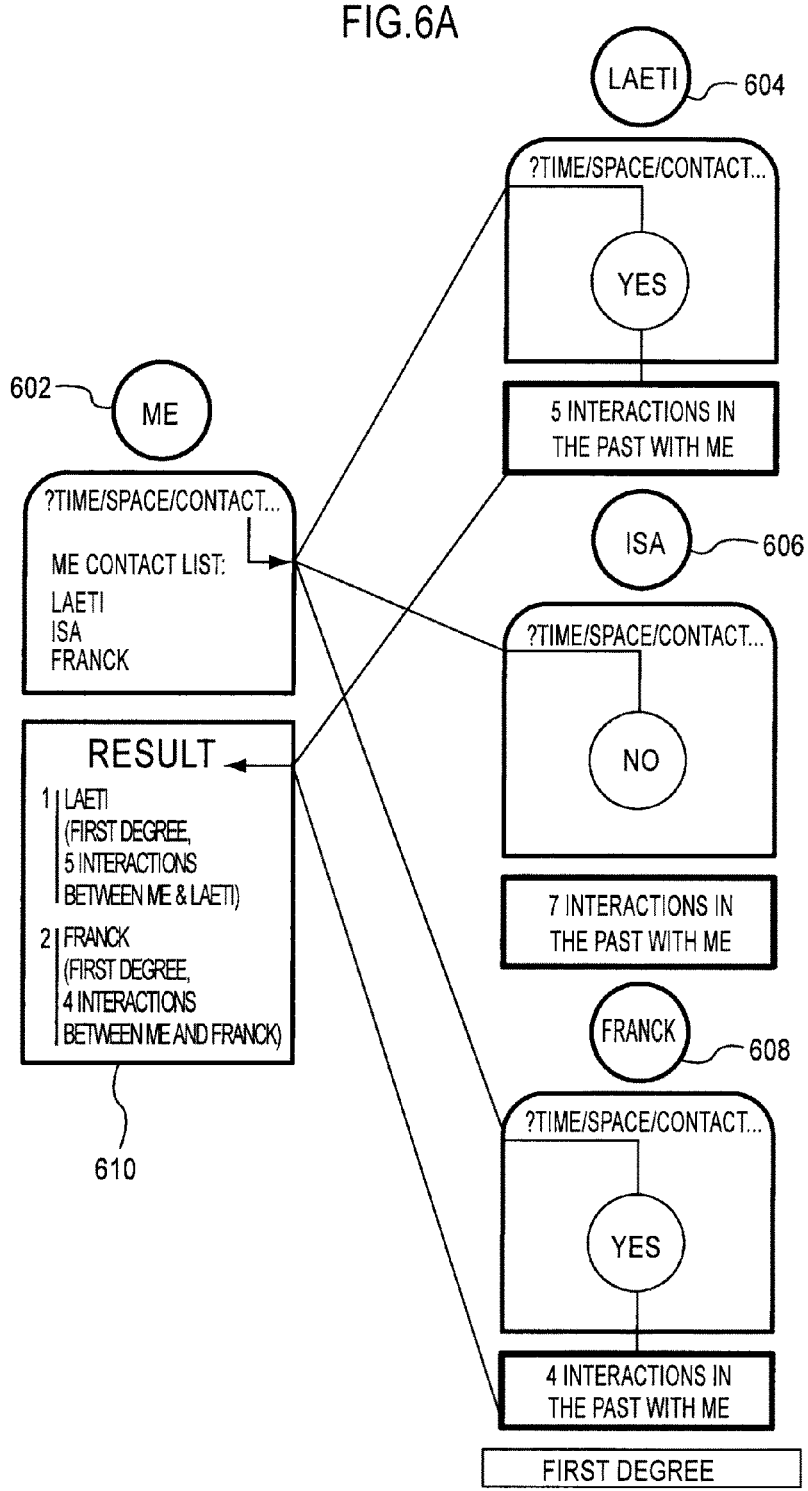

NETWORK PEER-TO-PEER GOODS AND SERVICES DELIVERY SYSTEM AND METHOD FOR RANKING PEERS BY DEGREES OF ASSOCIATION

RELATED APPLICATIONS

This application claims the benefit of U.S. Provisional Application No. 61/071,133 titled NETWORK PEER-TO-PEER GOODS AND SERVICES DELIVERY SYSTEM AND METHOD filed on Apr. 14, 2008, and U.S. Provisional Application No. 61/129,836 titled NETWORK PEER-TO-PEER GOODS AND SERVICES DELIVERY SYSTEM AND METHOD FOR RANKING PEERS BY DEGREES OF ASSOCIATION filed on Jul. 23, 2008. The entirety of each of the preceding applications is incorporated by reference herein.

BACKGROUND OF THE INVENTION

1. Field of the Invention

Aspects of the present invention are directed to a client-server peer-to-peer goods and/or services delivery system and method. Specifically, aspects of the present invention are directed to creating and maintaining relationships (e.g., of a social, commercial or professional nature) among registered (or otherwise related) peers by means of Internet-enabled mobile devices. Aspects of the present invention provide for the identification of networked peers, and for the delivery of services (professional, commercial or otherwise) by processing and matching, in real time, each peer location (data location) in conjunction with specific individual queries at a given moment in time.

Aspects of the present invention are directed to ranking and displaying results of individual peer queries by calculating degrees of association (i.e., peers in common of a first, second or subsequent degrees) among the query-originating peer and matching peers identified by the system. In accordance with aspects of the present invention, the degrees of association may be determined by examining, in real time, the number of peers of a first or subsequent degrees the query-originating peer has in common with peers identified by the system. Peer ranking also combines the respective data location of the peers (e.g., the geographical proximity among the peers) at a specific moment in time (e.g., at the time the query takes place, at a time specified by the originator of the query, etc.).

2. Background of the Related Art

One problem that exists in the art today is that there is currently no available vehicle for identifying and connecting matching peers to enable the delivery of online services/goods in the "physical world" via Internet-enabled and Global Positioning System (GPS)-enabled mobile devices. Specifically, there is currently no available mechanism that allows real-time importing and combining of individual user profiles, the profiles including the geographical position of each peer at a given moment in time, with specific individual queries. For example, there is currently no available method and system that would combine existing online and traditional services (such as Facebook, Plaxo, MySpace, and Yellow Pages, among others) into a single mobile platform that supports the establishment of connections to enable the delivery of goods and/or services among the members of such networks as a function of their geographical position at a specific moment in time, and as a function of specific queries and individual profiles or preferences.

Further, there is currently no available method and system for users of these existing online and traditional service that provide the ability to identify matching peers based on specific queries, in conjunction with their respective geographical location at a specific moment in time, and their suitability and availability to provide the goods/services requested by the querying peer.

Moreover, there is currently no method and system that assigns ranks and/or arranges/displays the results of specific individual peer queries based on the number of associations between the peer querying the system and the matching peers identified by the system. The ranks assigned to the peers identified by the system—and the order in which such peers are displayed—are calculated by taking into consideration the degrees of peer association among the query-originating peer and the peers identified by the system (e.g., the number of peers that the originating peer and the peers identified by the system as a result of the query have in common at first or subsequent degree) in combination with the geographical location of each identified peer with regard to the location of the originator of the query, at a specific moment in time.

In addition, there is currently no available system and method for calculating search results, and modifying their ranks respectively, based on additional criteria including, among other factors, individual user queries or user preferences pertaining to individual peer profiles.

Additionally, there is currently no system and method that provide for identification and display of a limited number of matching peers (e.g., within large population groups) that are likely to be the most relevant individuals sharing common affinities (personal, professional or commercial) with the query-originating peer. As an example, when considering the number of direct or indirect relations among peers, if each peer has, on average, e.g., 100 first degree peers (such as direct "friends" or "contacts"), and if each of these first degree peers has another 100 direct first degree peers, the originator of a specific search query can potentially receive 10,000 hits or results in a single query ($100^2=10,000$). If the search is extended to third or subsequent degree peers (friends of friends of friends . . . ), the search results can theoretically include a list of one million or more hits ($100^3$) and potentially identify one million or more matching individual peers. Therefore, there is a need in the art for a method and systems that assign ranks to search query results by determining—in real time and taking into account the geographical proximity between the originator and the other peers identified by the system at the moment of the query—the number of peers (of first, second and/or subsequent degrees) that the originator of a specific query has in common with each matching peer identified by the system and to display, and that arrange/display the results of such searches accordingly.

There is a further need in the art for a method and system that rank and display first the matching peers that have more peers (e.g., of a first or subsequent degrees) in common with the originator of the query, which increases the likelihood that individuals will share friends (peers) and/or other social, professional or other affinities in common.

SUMMARY OF THE INVENTION

Aspects of the present invention solve the above-identified needs, and others, by providing method and system for identifying the best-suited individual provider of services/goods via Internet and GPS-enabled mobile devices. The method and system of the present invention allow individual user profiles and specific individual queries with the respective data location of each user to be imported, processed and matched. In addition, the method and system of the present invention combine existing online and traditional services (such as Facebook, Plaxo, MySpace, and Yellow Pages, among others) into a single mobile platform.

Further, aspects of the present invention allow for calculation of degrees of association among the peer originating the query and the matching peers identified by the system (based on common peers between the originator of the query and the matching peers). In accordance with aspects of the present invention, ranks are assigned to the matching peers, while enabling the display of a limited number of matching peers (e.g, within large population groups) with most common affinities (e.g., personal, commercial or otherwise) with the query-originating peer, thereby ensuring that the limited number of matching peers are most likely to be relevant with respect to the originating peer.

Additional advantages and novel features of the invention will be set forth in part in the description that follows, and in part will become more apparent to those skilled in the art upon examination of the following or upon learning by using the invention.

BRIEF DESCRIPTION OF THE FIGURES

For a more complete understanding of the present invention, the needs satisfied thereby, and the objects, features, and advantages thereof, reference now is made to the following description taken in connection with the accompanying drawings.

FIGS. 6A-6E show exemplary search query results in accordance with aspects of the present invention.

DETAILED DESCRIPTION OF THE INVENTION

The present invention is directed to a location-based peer-to-peer client-server application for the delivery of online goods and/or services to individual users (peers) through the combined processing of data location relating to the position (data location) of peers in a network in conjunction with the degrees of associations among peers, their individual profiles and/or as a response to a specific query (or modifications of peers' individual profiles), also including a time component, sent by individual network peers.

The client application is installed on Internet enabled mobile devices, such as mobile phones, PDAs, Blackberry devices, or the like. Such devices can be used to register and create individual peer profiles on the server application as well as to transmit individual queries to other users, via the server application. The server application contains a repository of, e.g., registered peer profiles in association with the peers' data locations. At the request of individual users, data location enabled mobile devices may broadcast the coordinates of each networked peer. It will be obvious to those of ordinary skill in the art, that in addition to the server application containing a repository of registered peer profiles, the method and system of the present invention may access and already created data repository, such as that of LinkedIn or Facebook, for example.

For social networking purposes, the server application compares each individual peer profile with those of other active peers on the network and determines those peers that present similarities in their profile. In addition, by comparing contact lists between registered peers the server application will determine, in real time, the degree of proximity between users and allow for direct communication among peers with one degree of proximity (e.g., friends).

For peers that are two degrees away (e.g., friends of friends) or more, the client-server application may offer the possibility to solicit an introduction from a common friend before providing the necessary information (phone, email, direct device-to-device connection, etc.) to establish a direct contact with a second-degree peer. Depending on the application, and if an individual user allows for limited exchange of information with unknown peers, the server may authorize peers that have matching profiles to share limited personal data, including but not limited to a reference to common friends or to shared interest (e.g., "I'm a fan of this band," "I kite surf," etc.), and may allow individual users to decide if they wish to accept a query from the unknown peer due to such similarities, proximity or similar interests identified by the server application and relayed to the client.

For commercial applications, however, peers may be offered direct access to commercial providers.

Figure 1:
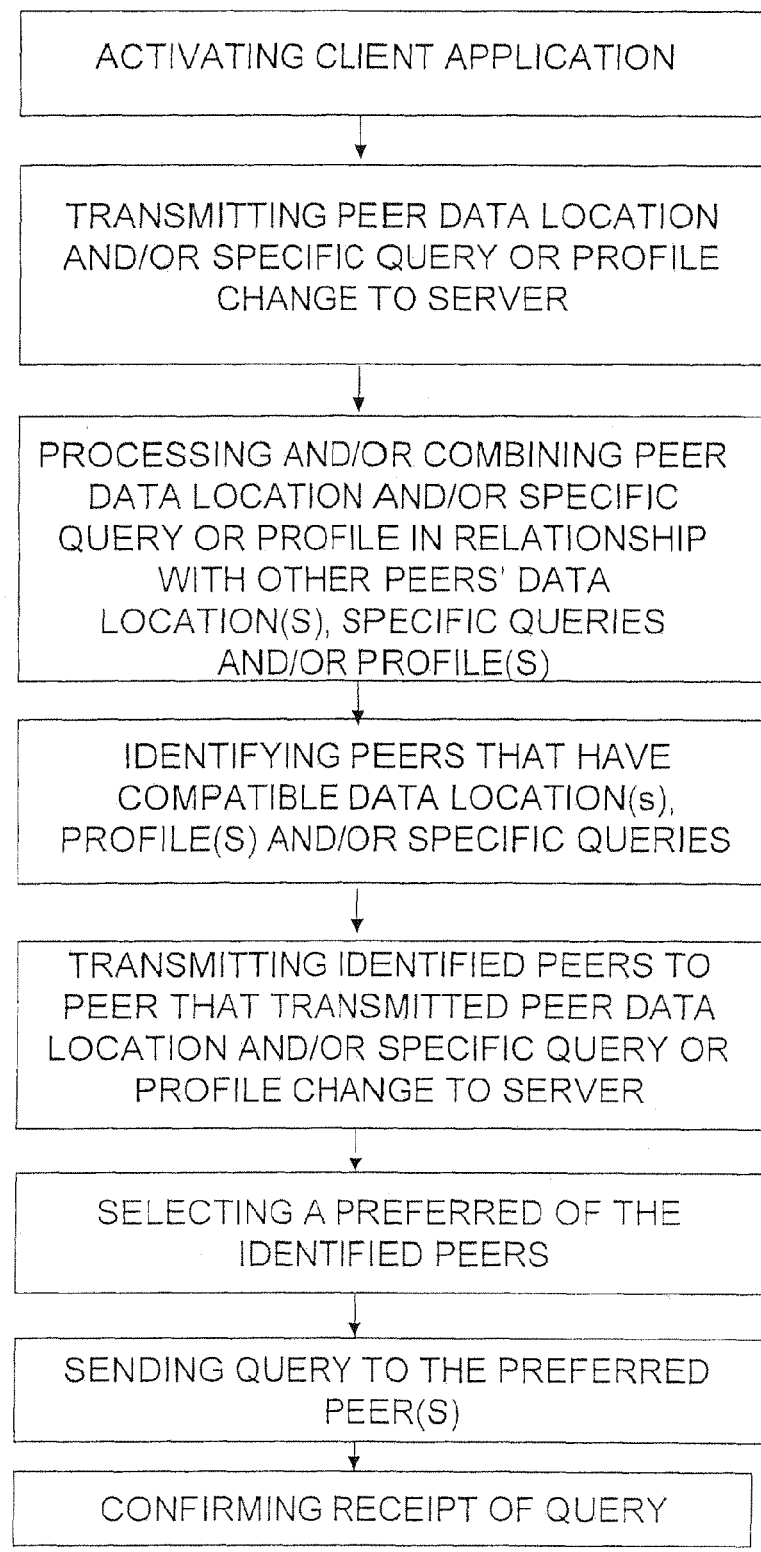
FIG. 1 shows an exemplary flowchart of the method for delivery of online services/goods via Internet-enabled consumer mobile devices, in accordance with an aspect of the present invention.

Referring now to FIG. 1, therein shown is an exemplary flowchart of the method for delivery of online services/goods via Internet-enabled consumer mobile devices, in accordance with an aspect of the present invention. The method begins with activating a client application 102. Peer data location, specific query and/or profile change is transmitted to a server 104. Processing and/or combining the peer data location, specific query and/or profile change is performed in relationship to other peers' data locations, specific queries and/or profiles 106. Peers having compatible data locations, specific queries and/or profiles are identified 108. The identified peers are transmitted to the peer transmitting the peer data location, specific query and/or profile change 110. A preferred of the identified peers is selected 112. A query is transmitted to the preferred identified peer 114. Receipt of the equerry is confirmed 116.

Figure 2A:
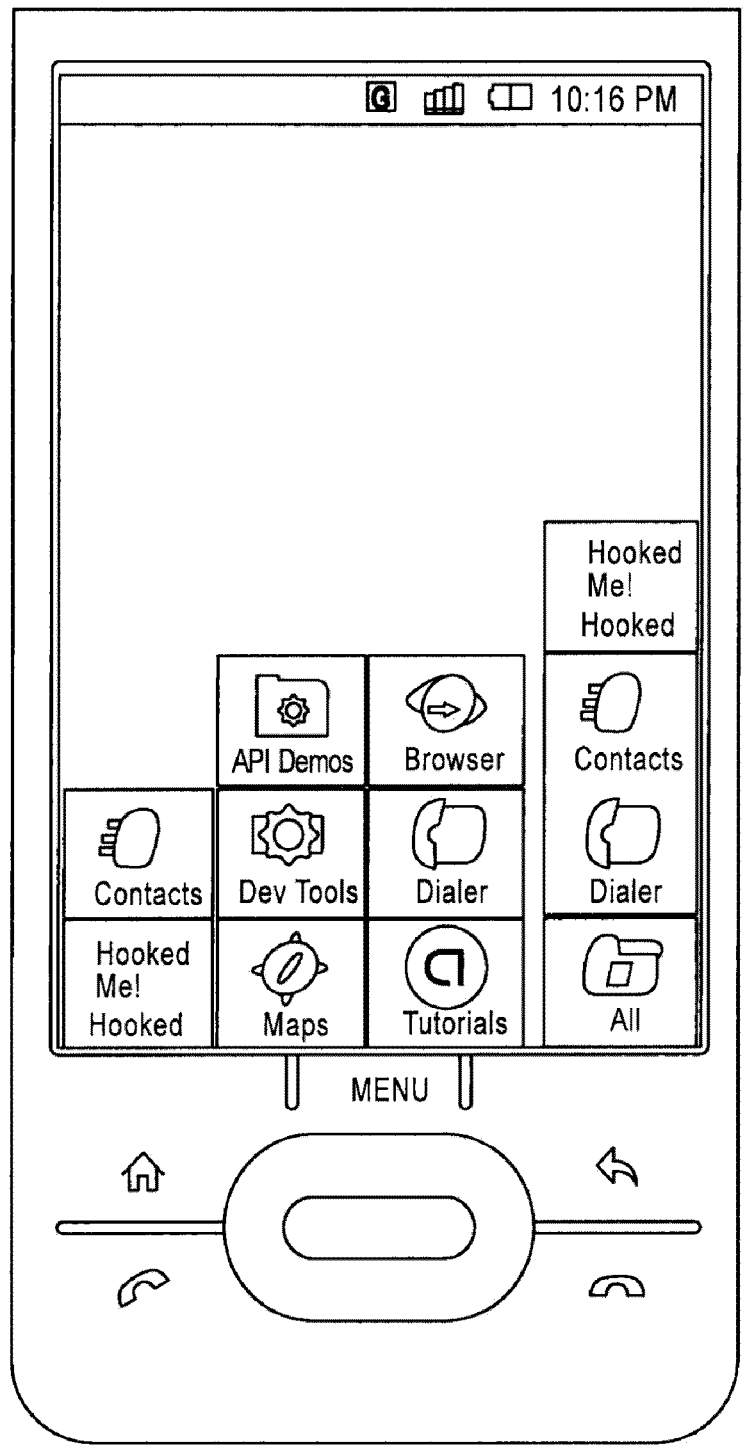
FIGS. 2A-2BB present exemplary Graphic User Interface (GUI) screens, in accordance with an aspect of the present invention.
Figure 2A:
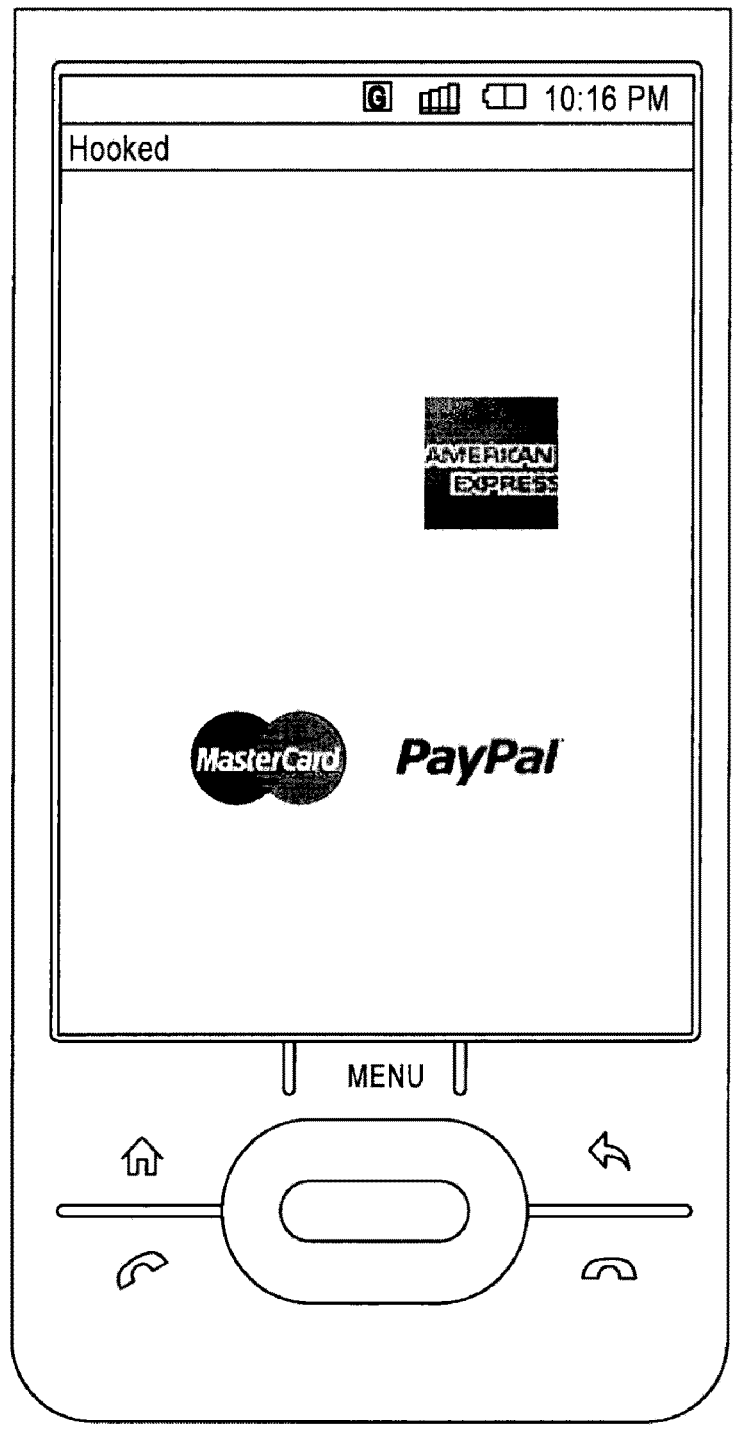
Figure 2B:
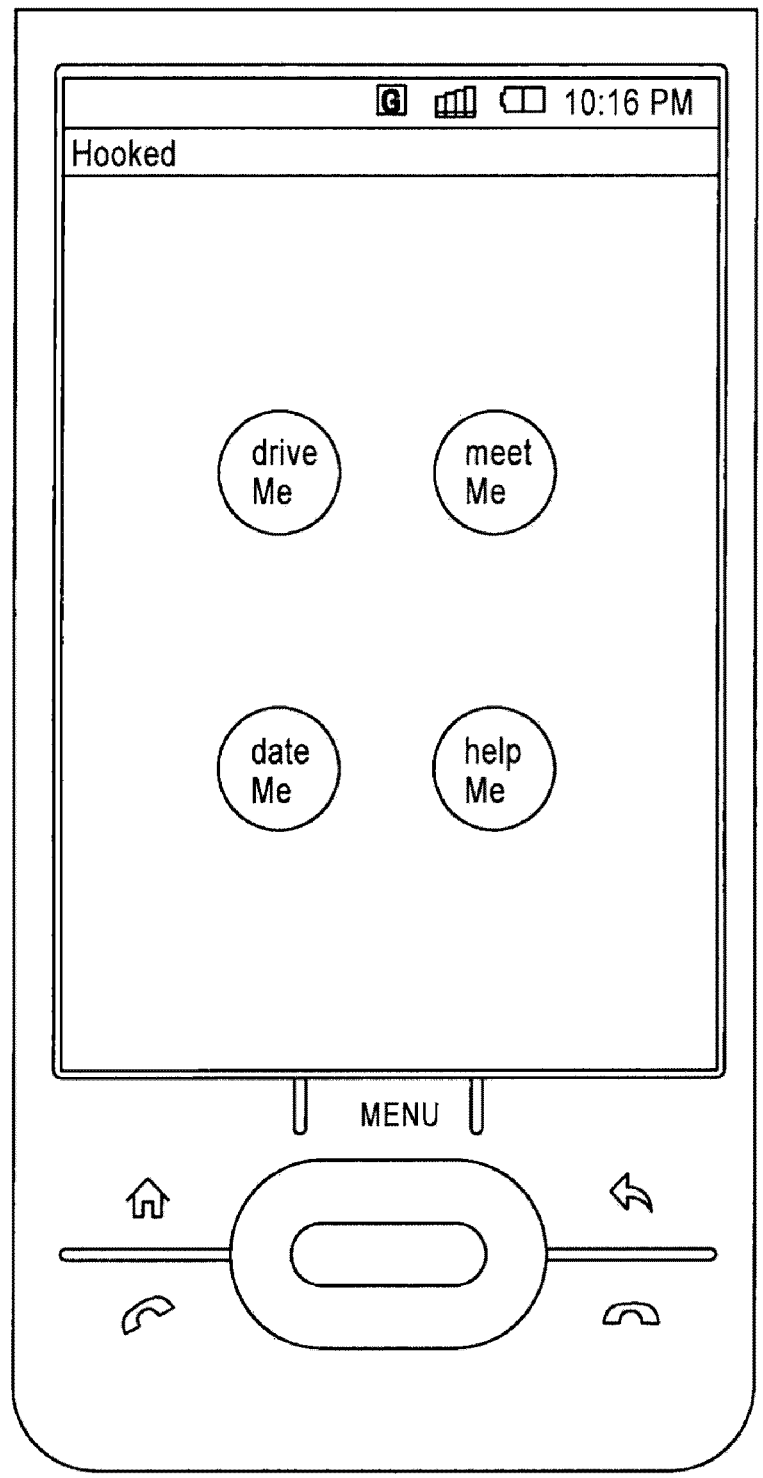
Figure 2B:
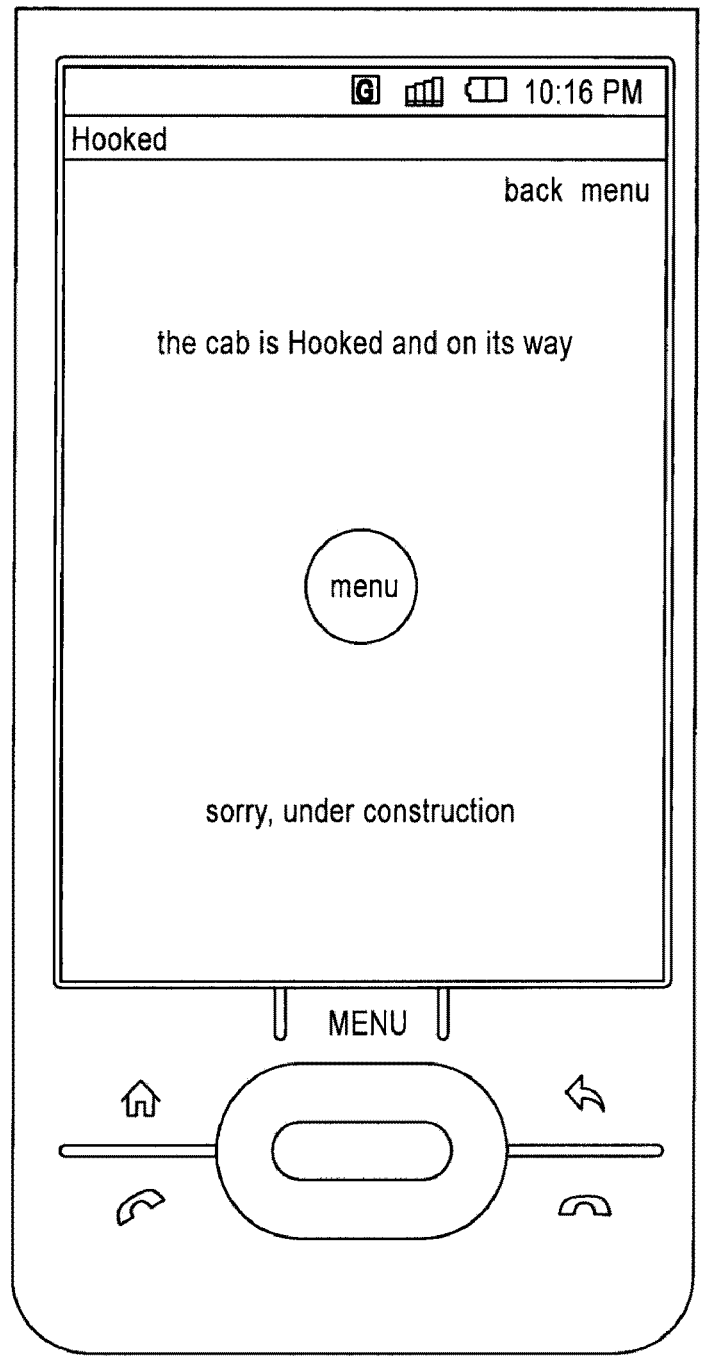

Referring now to FIGS. 2A-2BB, therein shown are exemplary GUI screens, in accordance with an aspect of the present invention for a cab ordering/sharing service. Although this aspect, described in more detail below, is presented in reference to ordering/sharing a cab service, it will be appreciated by those of ordinary skill in the art that the present invention is applicable to any location-based peer-to-peer client-server application for the delivery of online services to individual users (peers) through the combined processing of data location relating to the position (data location) of peers in a network in conjunction with their individual profile and/or as a response to a specific query (or modifications of peers' individual profiles) sent by individual network peers.

The exemplary aspect of the present invention shown in FIGS. 2A-2BB illustrates the functioning of the client-server application for a cab ordering/sharing service. As with other client server-applications, this aspect combines individual user data location and certain individual peer profiles data fields (e.g., name, telephone numbers, etc.) with a query for transportation (by cab or car sharing) sent by a network peer.

In this aspect, the present application combines data location feeds and maps (e.g., provided by the Google™ server) with data location and personal information (profiles) of three cab drivers (commercial cab service) and another peer (car sharing and community-based approach).

Each user of the cab ordering/sharing service may be a registered member of a specific on-line peer network. All users may, for example, have accepted the service privacy policy in order to join the specific on-line peer network. Membership may be free of charge or fee based, depending on the business model. A network peer (e.g., Joe) activates his client application on his mobile device. The client application begins broadcasting data-location to the server as well as other specific queries initiated by the peer (e.g., "Joe needs transportation in an hour in order to get to San Francisco airport"). The client is registered in the database, alongside with all others active peers on the network. Each client data location is associated with a unique peer profile. The server begins to process the individual query in conjunction with other peers data locations (e.g., how far are they from Joe) and profiles (e.g., "I'm a cab driver and I'm free to pick up Joe" or "I'm happy to share a drive with Joe" for the car sharing).

The server application uses Joe's query to identify other peers (commercial cab or car share) that may have a matching profile (i.e., drivers in the neighborhood, available, or willing to share a car with Joe). Once the search is complete, the server submits the results to Joe's client as well as to the other peers that have been identified to match both location and profile requirements (i.e., free cabs nearby, or a car sharer). The client displays the drivers' information in list format, on a map or a combination of both. The client (Joe) selects the most convenient driver. The server sends the query to the relevant driver (cab or car sharer) for confirmation. The cab driver receives the request and confirms the pick up on his individual Internet enabled device or by any other means of information provided to the members of the peer network. In the instance of a commercial cab service and if the entire process is carried out on the mobile device client applications, the peer and the commercial provider (Joe and the cab driver) can process the financial transaction via the payment infrastructure of the service provider.

In accordance with an aspect of the present invention, a ranking component may be implemented, for ranking the results of specific individual queries based on the data location, individual user profiles and/or a time component, if applicable, based on the preferences of the user, or based on user preferences specified in the user's profile. Thus, this aspect of the present invention would permit the originator of the individual query to receive and ordered list of results, ranked in an order that is specifically relevant to the originator, based on the originator's profile or other preferences.

In accordance with one aspect, a personal data set for each user may be created and/or accessed by the method and system of the present invention. The personal data set may include, for example, network peers, a data location, a time component, and/or a personal data set. In accordance with one aspect, the personal data set may reside on the client device, which may provide the user with editing capabilities regarding the personal data set, and/or other resident data. Network peers may include peers of the first degree (e.g., friends), peers of the second degree (peers of peers, or friends of friends), peers of the third degree (peers of second degree peers), and peers of further degrees (including all other potential peers).

The data location may be the user's actual current location, as determined via a Global Positioning System (GPS), triangulation technique, or otherwise. The data location may also be a future location input by the user, such as "I will need a taxi at the corner of $3^{rd}$ Street and Second Avenue."

The time component may include the current time, as determined by a clock, for example, or a future time specified by the user, such as "I will need a taxi at 10:00 a.m. this morning."

The personal data may be input by the user, or accessed, with the user's permission, in an existing data repository, such as LinkedIn or Facebook. Such personal data, whether input or otherwise accessed, may include age, gender, one or more photographs, and education, among other information. In addition, the personal information may include personal preferences, such as preferred wine, books, music, movies, sports, and hobbies, among other preferences.

In accordance with an aspect of the present invention, as applicable to social interactions, a user may specify search criteria relating to friendship, dating, relationships, and/or networking for example. In addition to the search criteria, sub-groups may be specified, such as dinner, lunch, dancing, drinks and/or a specific event, among other sub-groups.

Upon conducting a search, whether in accordance with the social or commercial aspects of the present invention, a user may receive ranked or otherwise personalized results that are relevant to the specific query, combined with the personal data set of the user. Thus the results are ranked in a personalized manner for each specific user running the same query, for example. The ranking criteria may include one or more of the following: degree of peer proximity (e.g., highest number of peers in common, or geographical peer proximity) and/or personal evaluations from one or more peers, among other criteria.

Thus, if ranked according to the degree of peer proximity, the results of the query may be ranked in real time based on the highest number of peers in common, for example. Alternatively, the results may be based on geographical proximity, with the highest ranking provided to the results that correspond to the geographically closest peers in real time. Further the results may be ranked based on past interactions with network peers (such as via text messaging, telephone call and/or e-mail), or on past geographical proximity (previous encounters and/or meetings, for example). Additionally, the results may be ranked based on evaluations of the goods or services from other peers.

Moreover, in accordance with one aspect, the results may be filtered in accordance with degrees of associations among peers (i.e., in degree categories, using the above ranking criteria). For example, a first degree category would include peers, a second degree category would include peers of peers, a third degree category would include peers of second degree peers, etc.

In accordance with another aspect of the present invention, additional applications that provide access to the search results, whether ranked or otherwise. Such additional applications may include: poke (for second and third degree peers); chat (one-to one and/or one-to-many), texto, e-mail, video, and/or telephone or Voice over Internet Protocol (VoIP).

In accordance with yet another aspect of the present invention, a service invoicing component may be provided with the method and system of the present invention, including payment per search, per use, and/or on credit, among other available options. For example, the service invoicing component may include payment per search (for both commercial and social searches), with large invoices appearing directly on the search result list. In addition, the service invoicing component may include payment per use (e.g., charge per Short Message Service (SMS), e-mail, telephone, and/or chat usage). Payment on credit, in accordance with one aspect, may be used for social networking, e.g., the users that generate interest and interaction with peers may receive communications on credit.

Figure 5:
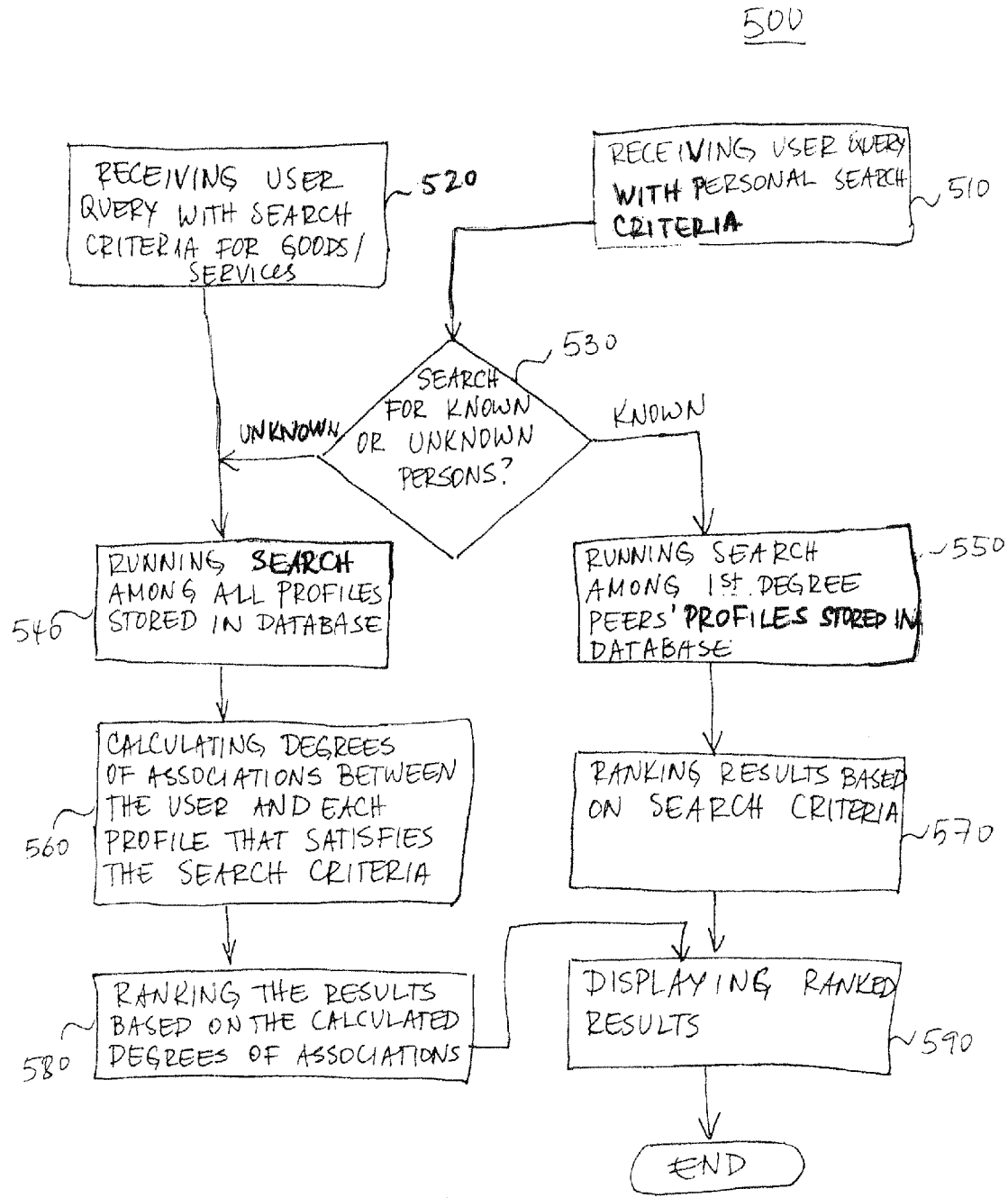
FIG. 5 is an exemplary flow chart of a method for calculating the degrees of associations among peers and ranking of results, in accordance with aspects of the present invention.

Referring now to FIG. 5, therein shown is an exemplary flow chart of a method 500 for calculating the degrees of associations among peers and ranking of search results, in accordance with aspects of the present invention. The method 500 begins with receiving a user query, containing either personal search criteria 510 or search criteria for goods and/or services 520. If the received query contains personal search criteria, a determination is made regarding whether the search is for known persons (e.g., peers of the first degree) or for unknown persons (e.g., peers of the send and higher degrees) 530. If the search is for known persons (e.g., "I want to go to dinner with a friend at 8:00 pm in Washington, D.C."), the search is run in the database, which is described in more detail above, among all the peer profiles that have a first degree relationship with the user 550. The results are ranked based on the peer profiles of the first degree that most closely fulfill the search criteria 570, and the ranked results are displayed to the user 590. The user may then contact his first degree peers (i.e., friends) by any method, such as telephone or e-mail, among others, and ask them whether they are interested in the subject of the search.

If the search is for an unknown person (e.g., "I'd like to meet a woman between 35 and 45 years of age with a college degree for a drink at 6:00 pm in Boston"), the search is run among all profiles in the database 540. The degrees of associations between the user and each peer profile that satisfies the search criteria are calculated 560. The results are ranked 580 based on the calculated degrees of associations, and are displayed to the user 590.

If the received query relates to goods and/or services 520, a search is run among all profiles stored in the database, resulting in profiles that satisfy the query. The degrees of associations between the user and each peer profile that satisfies the search criteria are calculated 560. The results are ranked 580 based on the calculated degrees of associations, and are displayed to the user 590.

Additional criteria that may be used to rank the results may include, for example, peer evaluation criteria, such as an evaluation that peers made in the course of personal interaction with a peer, or interaction with a commercial entity.

Figure 3:
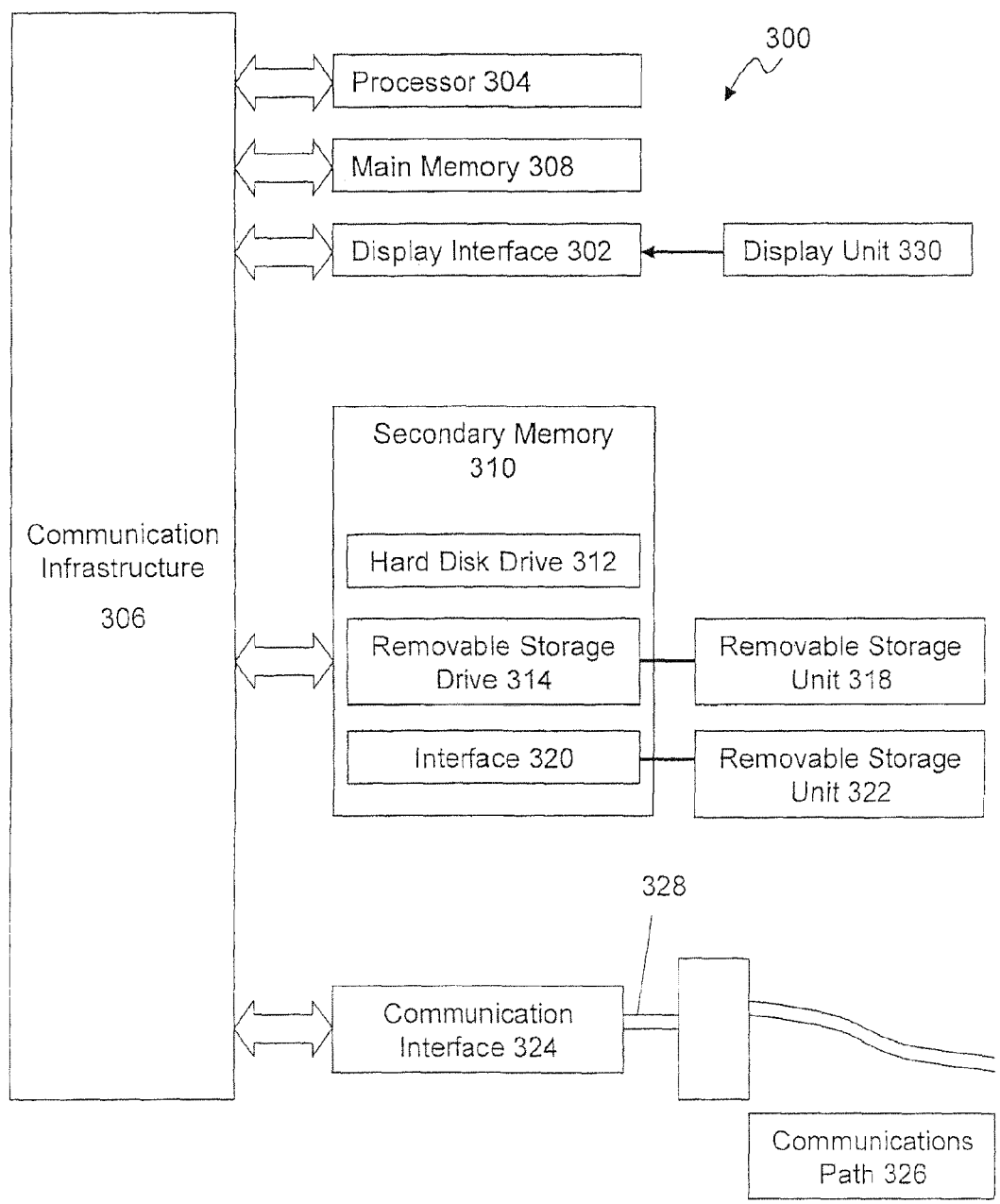
FIG. 3 presents an exemplary system diagram of various hardware components and other features, for use in accordance with an aspect of the present invention.

The present invention may be implemented using hardware, software, or a combination thereof and may be implemented in one or more computer systems or other processing systems. In accordance with one variation, a software aspect of the present invention may be implemented in Java 1.5, among other options. In one aspect, the invention is directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc., which is read by and written to removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 314, a hard disk installed in hard disk drive 312, and signals 328. These computer program products provide software to the computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 310 to perform the features of the present invention. Accordingly, such computer programs represent controllers of the computer system 300.

In an aspect where the invention is implemented using software, the software may be stored in a computer program product and loaded into computer system 300 using removable storage drive 314, hard drive 312, or communications interface 320. The control logic (software), when executed by the processor 304, causes the processor 304 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 4:
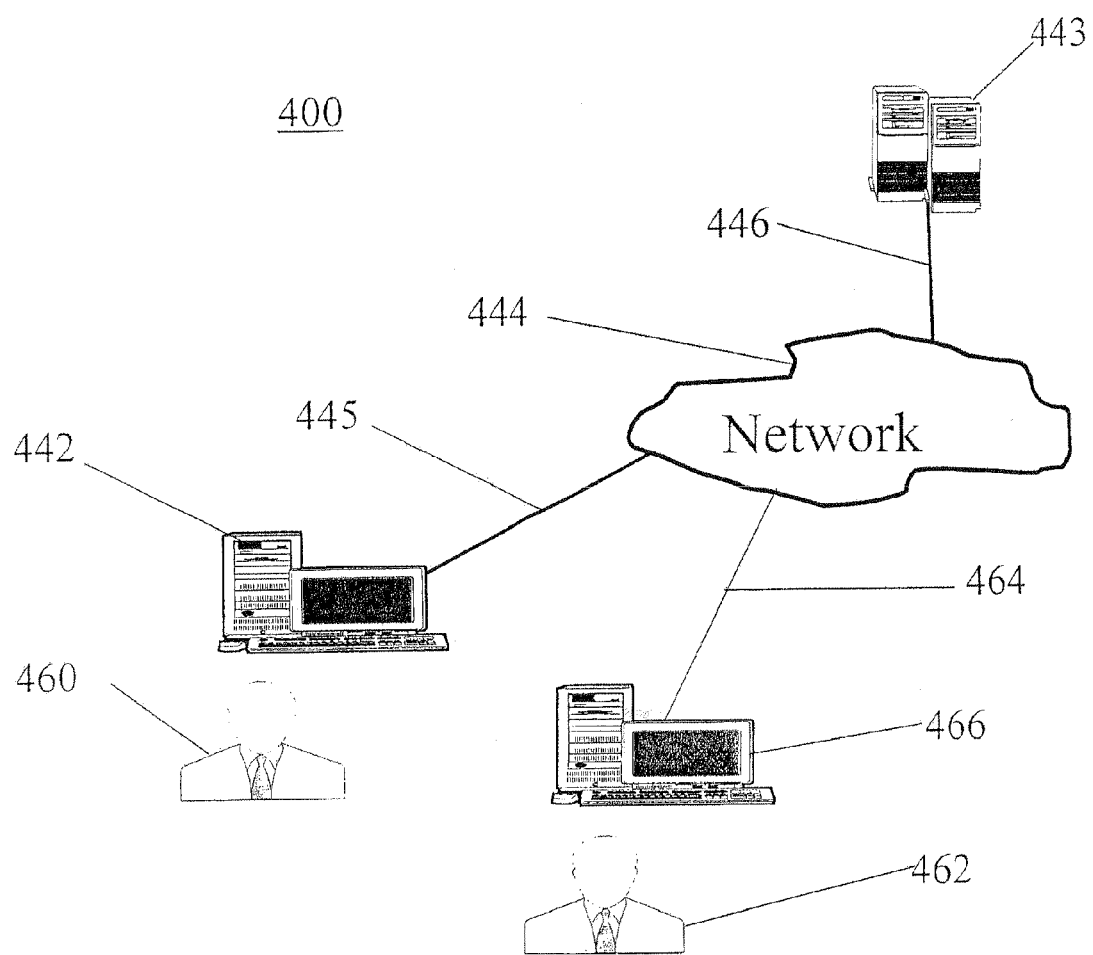
FIG. 4 is a block diagram of various exemplary system components, for use in accordance with an embodiment of the present invention.

FIG. 4 shows a communication system 400 usable in accordance with the present invention. The communication system 400 includes one or more accessors 460, 462 (also referred to interchangeably herein as one or more "users") and one or more terminals 442, 466. In one aspect, data for use in accordance with the present invention is, for example, input and/or accessed by accessors 460, 464 via terminals 442, 466, such as personal computers (PCs), minicomputers, mainframe computers, microcomputers, telephonic devices, or wireless devices, such as personal digital assistants ("PDAs") or a hand-held wireless devices coupled to a server 443, such as a PC, minicomputer, mainframe computer, microcomputer, or other device having a processor and a repository for data and/or connection to a repository for data, via, for example, a network 444, such as the Internet or an intranet, and couplings 445, 446, 464. The couplings 445, 446, 464 include, for example, wired, wireless, or fiberoptic links. In another aspect, the method and system of the present invention operate in a stand-alone environment, such as on a single terminal.

Figure 6B:
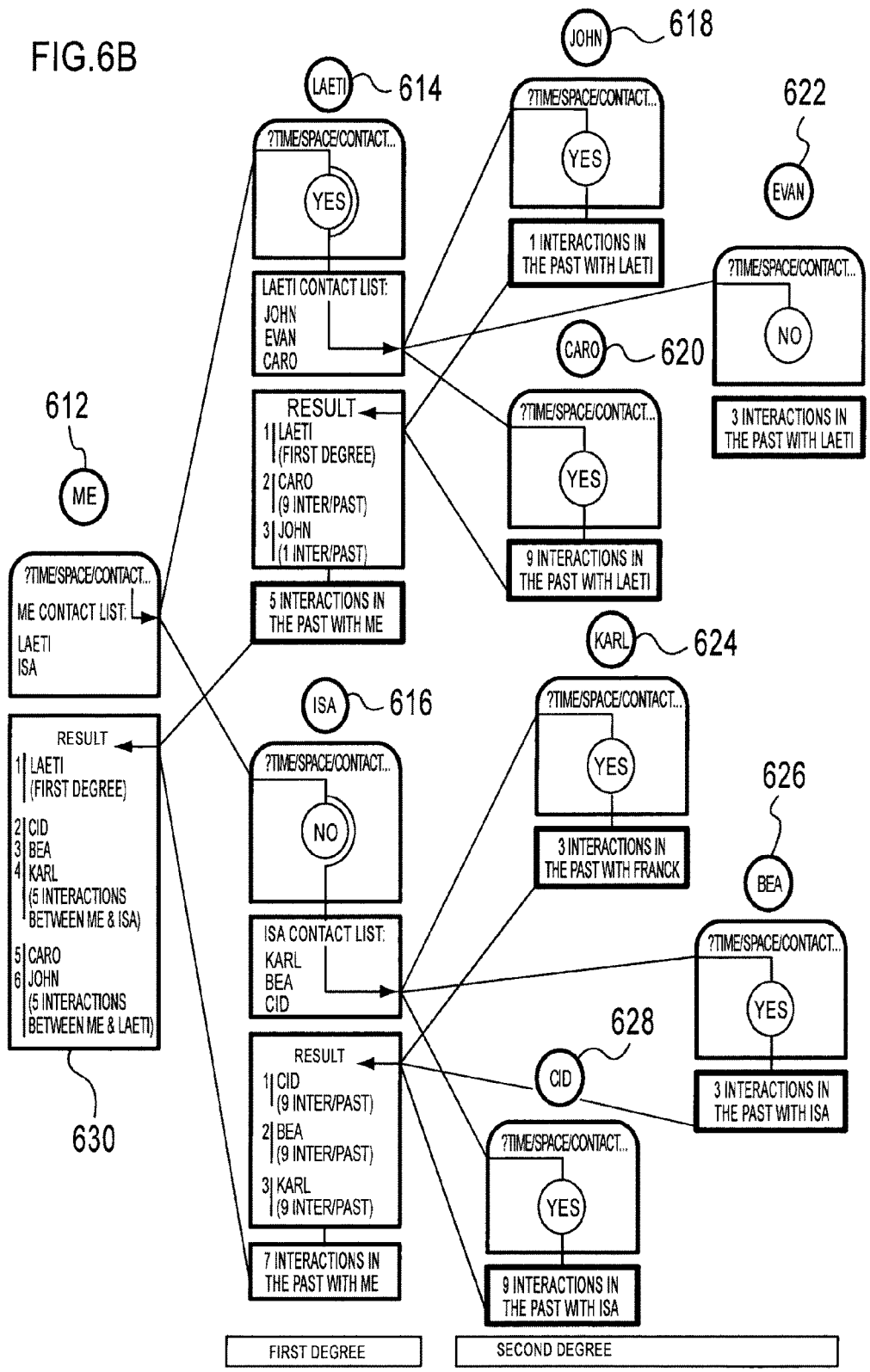

Referring now to FIGS. 6A-6E, therein shown are exemplary search query results in accordance with aspects of the present invention. In FIG. 6A, and exemplary first degree query is shown. Query originating peer ME 602 sends out an exemplary query "?TIME/SPACE/CONTACT . . . ," which is provided to ME's first degree peers LAETI 604, ISA 606 and FRANCK 608, for example. LAETI 604 and FRANCK 608 satisfy ME's query, while ISA does not. The result list of all peers satisfying the query 610 is displayed based on the number of interactions between ME 602 and the peers that satisfy the query LAETI 604 and FRANCK 608. LAETI 604 is ranked first in the result list based on LAETI's past 5 interactions with ME 602, and FRANCK 608 is ranked second based on 4 past interactions with ME 602. It should be noted that the ranking contemplated by the present invention is configurable, i.e., peers could be ranked in ascending, descending, or other order. Further, the interactions may be on-person contacts, other communications (e.g., e-mail, telephonic), or location coordinates (e.g., past or present location), where past interactions are recorded by the system if, e.g., the client application on a user's mobile device is activated.

In FIG. 6B, an exemplary second degree search query weighted by interactions among peers is shown. Peer ME 612 sends a query, which is provided to ME's first degree peers LAETI 614 and ISA 616, for example, as well as to ME's second degree peers through LAETI 614, JOHN 618, CARO, 620 and EVAN 622, as well as to ME's second degree peers through ISA 616, KARL 624, CID 628 and BEA 626. LAETI 614, JOHN 618, CARO 620, KARL 624, CID 628 and BEA 626 satisfy ME's query, while EVAN 622 and ISA 616, do not. The result list 630 includes LAETI 614 (first degree peer), CID 628, BEA 626 and KARL 624, CARO 620 and JOHN 618. CID 628 is ranked second after LAETI 614, based on the 7 interactions between ME and ISA, and the 9 interactions between ISA and CID. BEA 626 is ranked third based on the 7 interactions between ME and ISA, and the 3 interactions between ISA and BEA. KARL 626 is ranked fourth based on the 7 interactions between ME and ISA, and the 1 interaction between ISA and KARL. CARO is ranked fifth based on the 5 interactions between ME and LAETI, and the 9 interactions between LAETI and CARO. JOHN 618 is ranked sixth based on the 5 interactions between ME and LAETI, and the 1 interaction between LAETI and JOHN.

Figure 6C:
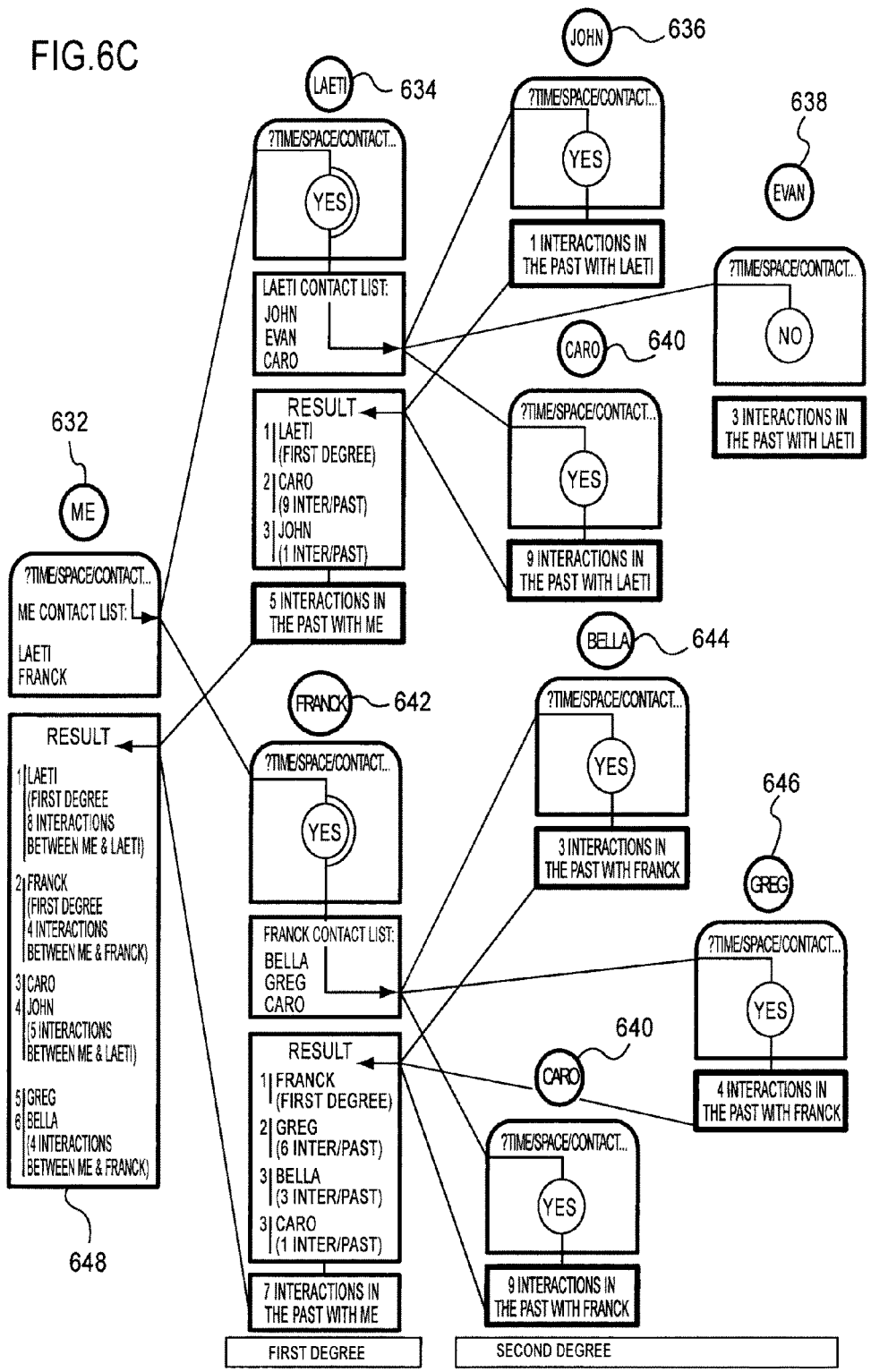

In FIG. 6C, an exemplary second degree search query weighted by interactions among peers and second degree peers is shown. The difference with FIG. 6B is in that CARO 640 is a second degree peer to ME 632 vi both LAETI 634 and FRANCK 642. All peers satisfy the query with the exception of EVAN 636. The result list 648 includes LAETI 634 ranked first based on 5 past interactions with ME 632, FRANCK, racked second based on 4 past interactions with ME 632, CARO ranked third based on LAETI's 5 interactions with ME and FRANCK's 4 interactions with ME, as well as on 9 interactions between LAETI and CARO, and 1 interaction between FRANCK and CARO. JOHN 636 is ranked fourth, based on LAETI's 5 interactions with ME. GREG 646 is ranked fifth based on FRANCK's 4 interactions with ME and the 4 interactions between FRANCK and GREG. BELLA 644 is ranked sixth based on FRANCK's 4 interactions with ME and the 3 interactions between FRANCK and BELLA.

Figure 6D:
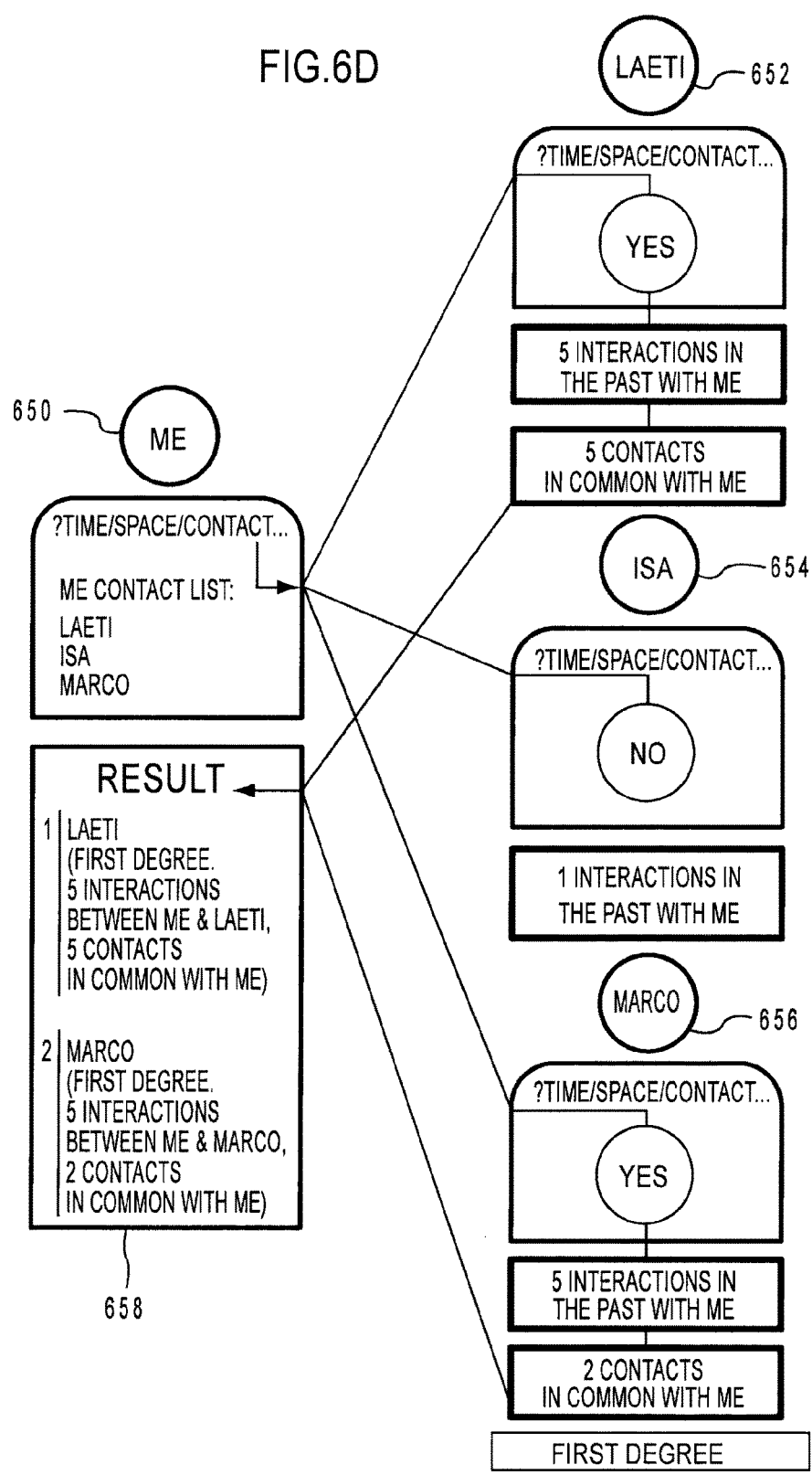

In FIG. 6D, an exemplary first degree search query in the case of the same number of interactions is shown, weighted by peers in common. Of ME's 650 first degree peers, LAETI 652 and MARCO 656 satisfy ME's query, while ISA 654 does not. Both LAETI 652 and MARCO 656 have 5 past interactions each with ME 650. However, LAETI 652 has five contacts in common with ME 650, while MARCO 656 has two contacts in common with ME 650. Therefore, in result list 658 LAETI 652 is ranked first and MARCO 656 second.

Figure 6E:
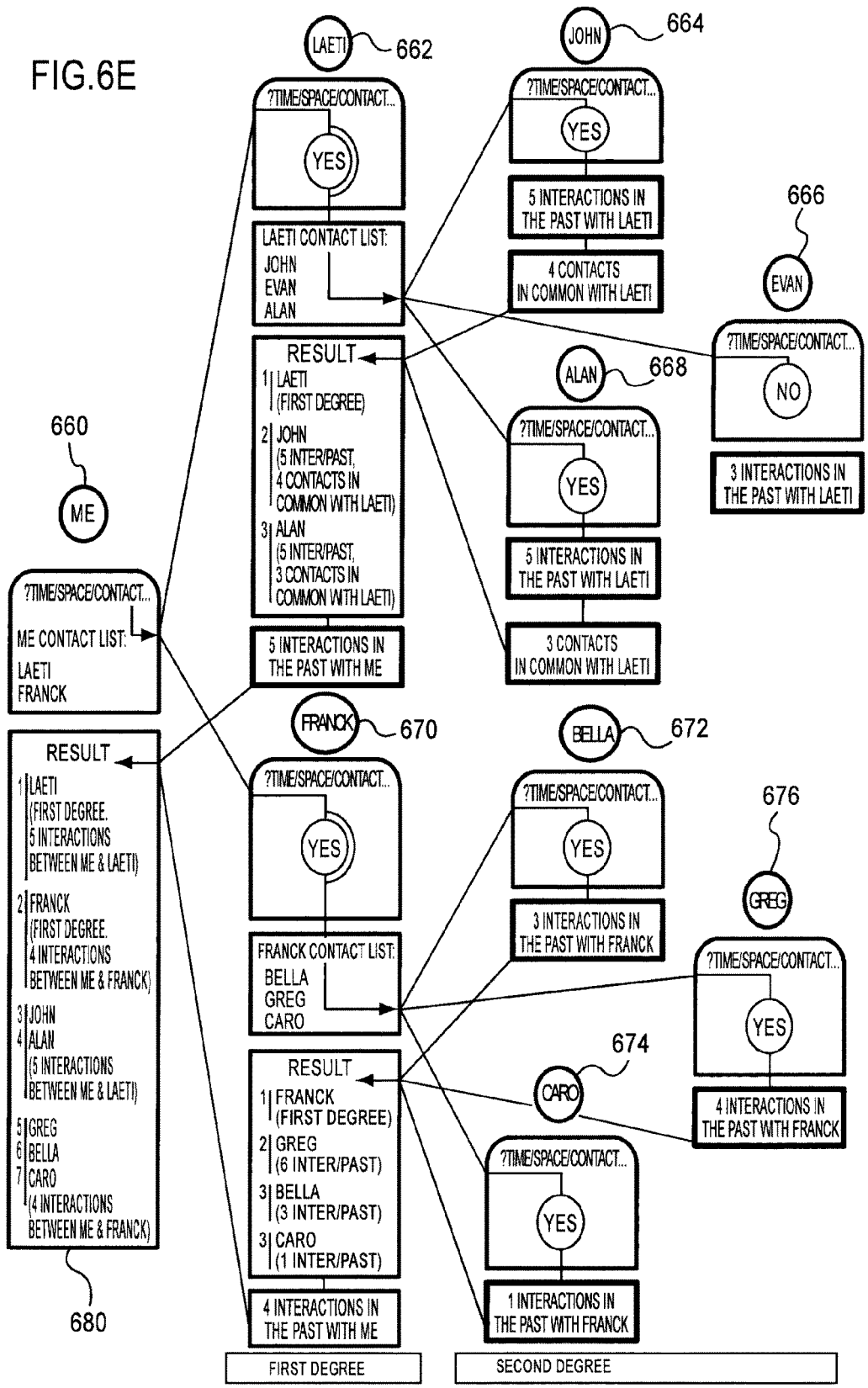

In FIG. 6E, an exemplary second degree search query in the case of the same number of interactions is shown, weighted by peers in common. Result list 680 includes LAETI 662 ranked first based on the 5 interactions between ME 660 and LAETI 662. FRANCK 670 is ranked second based on the 4 interactions between ME 660 and FRANCK 670. JOHN 664 is ranked third based on the 5 interactions between ME 660 and LAETI 662, the 5 interactions between LAETI 662 and JOHN 664, and the four contacts in common between LAETI 662 and JOHN 664. ALAN 668 is ranked fourth based on the 5 interactions between ME 660 and LAETI 662, the 5 interactions between LAETI 662 and ALAN 668, and the three contacts in common between LAETI 662 and ALAN 668. GREG 676, BELLA 672 and CARO 674 are ranked fifth, sixth and seventh, respectively, based on the four interactions between ME 660 and FRANCK 670, GREG's 676 four interactions with FRANCK 670, BELLA's 672 three interactions with FRANCK 670, and CARO's 674 one interaction with FRANCK 670.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein.

The invention claimed is:

1. A computer implemented method for providing a list of peers that satisfy a query for an item, the computer comprising a processor device, a user interface and a data repository storing peer profiles, the method comprising:
   receiving, from a query-originating peer having a profile stored in the data repository, a query with a search criterion for an item;
   performing, via the processor device, a search for the search criterion in the data repository storing peer profiles;
   obtaining, from the peer profiles stored in the data repository, a plurality of peer profiles having a degree of association with the query originating peer;
   determining, via the processor, a first group of the plurality of obtained peer profiles having a first degree of association with the query originating peer and a second group of the plurality of obtained peer profiles having a second degree of association with the query originating peer;

determining, via the processor, a third group of the plurality of obtained peer profiles that satisfy the search criterion for the item;

assigning a score to each of the peer profiles of the first and second groups based on a degree of association between the query originating peer and peers corresponding to the peer profiles of the first and second group;

selecting, from the third group, a fourth group of peer profiles that, each of the peer profiles of the fourth group having an assigned score of the first or second groups; and displaying the fourth group to the query originating peer via the user interface.

2. The method according to claim 1, wherein the data repository is associated with a server application.

3. The method of claim 1, wherein the user interface is associated with a client application.

4. The method of claim 1, further comprising:
ranking the peer profiles of the fourth group based on the assigned scores.

5. The method of claim 1, wherein the assigned score is based on a number of interactions between the query originating peer and each of the peers corresponding to peer profiles of the first group.

6. The method of claim 1, wherein the assigned score is based on a number of interactions between each of the peers corresponding to peer profiles of the first group and each of the peers corresponding to peer profiles of the second group.

7. The method of claim 1, wherein the item is a good or service.

8. The method of claim 1, wherein the item is a personal attribute.

9. The method of claim 5, wherein the interactions include recorded location information or electronic communications.

10. The method of claim 5, wherein the interactions include current location information.

11. A system for providing a list of peers that satisfy a query for an item, the system comprising a processor device, a user interface and a data repository storing peer profiles, the system comprising:
a module for receiving, from a query-originating peer having a profile stored in the data repository, a query with a search criterion for an item;
a module for performing, via the processor device, a search for the search criterion in the data repository storing peer profiles;
a module for obtaining, from the peer profiles stored in the data repository, a plurality of peer profiles having a degree of association with the query originating peer;
a module for determining, via the processor, a first group of the plurality of obtained peer profiles having a first degree of association with the query originating peer and a second group of the plurality of obtained peer profiles having a second degree of association with the query originating peer;
a module for determining, via the processor, a third group of the plurality of obtained peer profiles that satisfy the search criterion for the item;
a module for assigning a score to each of the peer profiles of the first and second groups based on a degree of association between the query originating peer and peers corresponding to the peer profiles of the first and second group;
a module for selecting, from the third group, a fourth group of peer profiles that, each of the peer profiles of the fourth group having an assigned score of the first or second groups; and
a module for displaying the fourth group to the query originating peer via the user interface.

12. The system according to claim 11, wherein the data repository is associated with a server application.

13. The system of claim 11, wherein the user interface is associated with a client application.

14. The system of claim 11, further comprising:
a module for ranking the peer profiles of the fourth group based on the assigned scores.

15. The system of claim 11, wherein the assigned score is based on a number of interactions between the query originating peer and each of the peers corresponding to peer profiles of the first group.

16. The system of claim 11, wherein the assigned score is based on a number of interactions between each of the peers corresponding to peer profiles of the first group and each of the peers corresponding to peer profiles of the second group.

17. The system of claim 15, wherein the interactions include recorded location information or electronic communications.

18. The system of claim 15, wherein the interactions include current location information.

19. A computer program product comprising a non-transitory computer usable medium having control logic stored therein for causing a computer to provide a list of peers that satisfy a query for an item, the computer comprising a processor device, a user interface and a data repository storing peer profiles, the control logic comprising:
first computer readable program code means for receiving, from a query-originating peer having a profile stored in the data repository, a query with a search criterion for an item;
second computer readable program code means for performing, via the processor device, a search for the search criterion in the data repository storing peer profiles;
third computer readable program code means for obtaining, from the peer profiles stored in the data repository, a plurality of peer profiles having a degree of association with the query originating peer;
fourth computer readable program code means for determining, via the processor, a first group of the plurality of obtained peer profiles having a first degree of association with the query originating peer and a second group of the plurality of obtained peer profiles having a second degree of association with the query originating peer;
fifth computer readable program code means for determining, via the processor, a third group of the plurality of obtained peer profiles that satisfy the search criterion for the item;
sixth computer readable program code means for assigning a score to each of the peer profiles of the first and second groups based on a degree of association between the query originating peer and peers corresponding to the peer profiles of the first and second group;
seventh computer readable program code means for selecting, from the third group, a fourth group of peer profiles that, each of the peer profiles of the fourth group having an assigned score of the first or second groups; and
eighth computer readable program code means for displaying the fourth group to the query originating peer via the user interface.

20. The computer program product according to claim 19, wherein the data repository is associated with a server application.

* * * * *